United States Patent [19]
Branson

[11] 3,809,313
[45] May 7, 1974

[54] FUEL CONTROL SYSTEM AND PRESSURE REGULATOR CONSTRUCTION THEREFOR AND METHOD FOR OPERATING THE SAME

[75] Inventor: Charles D. Branson, Greensburg, Pa.

[73] Assignee: Robertshaw Controls Company, Richmond, Va.

[22] Filed: Oct. 18, 1972

[21] Appl. No.: 298,521

[52] U.S. Cl. ............................. 236/15 A, 137/489.5
[51] Int. Cl. ............................................. F23n 5/06
[58] Field of Search ......... 236/15 A, 99; 137/489.5, 137/488, 491; 431/61, 90

[56] References Cited
UNITED STATES PATENTS

| | | | |
|---|---|---|---|
| 3,654,948 | 4/1972 | Nelson | 137/489.5 X |
| 3,411,710 | 11/1968 | Willson | 236/99 |
| 3,115,147 | 12/1963 | Mueller | 137/489.5 X |
| 2,273,111 | 2/1942 | Kindl | 137/489.5 |
| 3,471,087 | 10/1969 | Caparone et al. | 236/15 A X |

Primary Examiner—William E. Wayner
Attorney, Agent, or Firm—Candor, Candor & Tassone

[57] ABSTRACT

A fuel control system for a cooking apparatus having a source of fuel, main burner means and pilot burner means. A first pressure regulator for regulating the pressure of the fuel delivered from the source to the main burner means and a second pressure regulator for regulating the pressure of the fuel delivered from the source to the pilot burner means for both the operation of the standby flame means of the pilot burner means and the operation of the heater flame means of the pilot burner means independently of the pressure regulation of the fuel for the main burner means.

13 Claims, 2 Drawing Figures

3,809,313

FUEL CONTROL SYSTEM AND PRESSURE REGULATOR CONSTRUCTION THEREFOR AND METHOD FOR OPERATING THE SAME

This invention relates to an improved fuel control system for a cooking apparatus or the like as well as to an improved pressure regulator construction therefor and a method for operating such a control system or the like.

It is well known that pressure regulated fuel can be supplied to a fuel control system having main burner means and pilot burner means in such a manner that a control device is adapted to interconnect such pressure regulated fuel to both the pilot burner means and the main burner means when the control device is turned to an "on" position thereof.

However, it has been found according to the teachings of the invention that when the main burner means is turned on by having the pressure regulated fuel flow directed thereto, the pressure regulator must be adapted to supply sufficient fuel for supporting from a 1,000 BTUs per hour for a single main burner to a 150,000 BTUs per hour capacity as in the case of a cooking apparatus where several main burners in the oven and on the cooking top may be turned on to operate simultaneously. However, the pilot burner means for such a cooking apparatus merely have a requirement of from 100 BTUs per hour to 1,000 BTUs per hour depending upon the number of pilot burner means being utilized.

Thus, it has been found according to the teachings of this invention that it is relatively difficult to provide a single pressure regulator means that can supply fuel at the above rates for both the pilot burner means when the main burner means are in an off condition thereof and the mean burner means when the same are turned on because such a pressure regulator requires a relatively large valve member and valve seat therefor for supplying the larger fuel capacity during cooking and when such large valve means is only required for supplying the low fuel capacity for just the pilot burner means, dirt and the like tends to clog such valve means as the large valve member must be disposed relatively close to the valve seat in order to supply the low rate of fuel to the pilot burner means.

Accordingly, it is a feature of this invention to provide a pressure regulating means for a fuel control system wherein the above adverse situation is eliminated.

In particular, one embodiment of this invention provides separate pressure regulation for the pilot burner means and the main burner means with a pressure regulator means for the pilot burner means being completely independent of the operation of a pressure regulator means for the main burner means.

For example, one embodiment of the pressure regulator construction of this invention comprises a housing means having an inlet and an outlet. A first pressure regulator is disposed between the inlet and the outlet for regulating the pressure of the flow of the fluid delivered from the inlet to the outlet. The housing means has an inlet means in communication with the inlet downstream from the first pressure regulator and has an outlet means separate from the previously described outlet. A second pressure regulator is disposed between the inlet means and the outlet means for regulating the pressure of the fluid directed to the outlet means from the inlet means. The second pressure regulator is adapted to control the operation of the first pressure regulator.

When such a pressure regulator construction is utilized in the aforementioned fuel control system, the second pressure regulator controls the pressure of the fuel being directed to the pilot burner means for both the operation of the standby flame means therefor and the operation of the heater flame means therefor independently of the pressure regulation for the main burner means as the pressure of the fuel for the main burner means is being controlled by the first pressure regulator.

Accordingly, it is an object of this invention to provide an improved fuel control system having one or more of the novel features set forth above or hereinafter shown or described.

Another object of this invention is to provide an improved pressure regulator construction or the like.

Another object of this invention is to provide an improved method for operating a fuel control system or the like.

Other objects, uses, and advantages of this invention are apparent from a reading of this description which proceeds with reference to the accompanying drawings forming a part thereof wherein.

Figure 1:
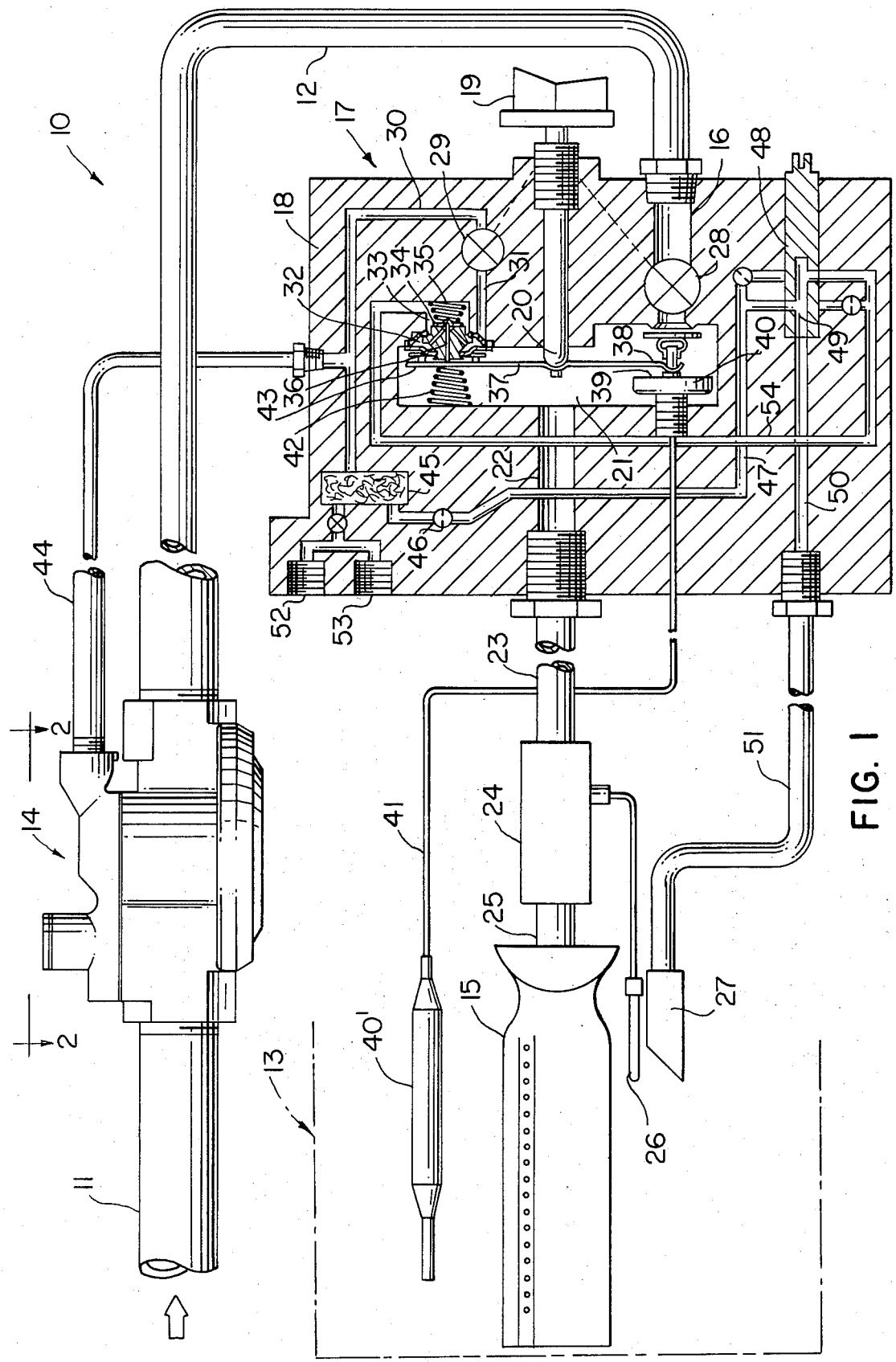
FIG. 1 is a schematic view illustrating the improved fuel control system and method of this invention.

Referring now to FIG. 1, the improved fuel control system of this invention is generally indicated by the reference numeral 10 and comprises a fuel source conduit 11 being adapted to be interconnected to a manifold 12 of a cooking apparatus that is indicated by dashed lines in FIG. 1 and generally indicated by the reference numeral 13. The fuel source conduit 11 is adapted to be interconnected to the fuel manifold 12 of the cooking apparatus 13 by a pressure regulator construction of this invention that is generally indicated by the reference numeral 14 in FIGS. 1 and 2 and later to be described in detail.

The cooking apparatus 13 has one or more main burner means, such as the main burner means 15 illustrated in FIG. 1 as being disposed in the oven of the cooking apparatus 13 and being utilized to control both a baking and broiling operation thereof in a manner well known in the art. For example, see the U. S. Pat. to Tyler, No. 3,341,119, which fully discloses a control system for a single burner means to provide both the heating and boriling operations thereof.

Therefore, it is deemed necessary to only described sufficient details of the cooking apparatus 13 and the control means therefor for a full understanding of the pressure regulator construction 14 of this invention as further details of the structure and operation of the fuel control system 10 can readily be obtained by referring to the aforementioned patent.

As illustrated in FIG. 1, the manifold 12 is interconnected to an inlet passage 16 of a control device 17 having a housing means 18 and a temperature selector knob 19 therefor for controlling the axial position of a fulcrum pin 20 within a chamber 21 formed in the housing means 18 as the knob 19 is being positioned at a desired temperature setting thereof. The chamber 21 leads to an outlet 22 that is adapted to be interconnected to a conduit 23 that leads to a safety valve construction 24 that is adapted to interconnect the conduit 23 with a conduit 25 for the main burner 15 when the valve means 24 is disposed in an open position thereof. It is well known that the valve means 24 is only adapted to be disposed in an open condition thereof when a flame sensing bulb 26 thereof senses that a large heater flame is existing at a pilot burner means 27 and not when only the continuously burning small standby flame exists at the pilot burner means 27.

The inlet 16 of the control device 17 is adapted to be interconnected to the chamber 21 thereof by a disc valve member 28 that is moved to an opened position thereof by the selector valve 19 being turned to an "on" position thereof, the control knob 19 also controlling another portion 29 of the disc valve 28 to interconnect a branch conduit 30 of housing means 18 with another branch passage 31 thereof when the control knob 19 is turned to an "on" position thereof.

The passage 31 is interconnected to a chamber 32 of the housing 18 that is adapted to be interconnected to another chamber 33 thereof when a valve member 34 is moved to its open position thereof in opposition to the force of a compression spring 35 under the action of an axially movable plunger 36 that is adapted to be moved to the right in FIG. 1 to open the valve member 34 when a lever 37 fulcrumed on the pin 20 is caused to pivot in a clockwise direction on the fulcrum 20 as hereinafter described whereby the chamber 32 will be interconnected to the chamber 33 for a purpose hereinafter described.

The lever 37 that is fulcrumed on the pin 20 has an end 38 thereof bearing against a movable wall 39 or an expandible wall 39 of an expandible and contractible power element 40 that has the fluid therein expanded and contracted by the temperature adjacent a temperature sensing bulb 40' interconnected to the power element by a capillary tube 41. The bulb 40' senses the output temperature effect of the burner means 15 so that when the temperature in the oven of the cooking appartus 13 exceeds the temperature setting of the selector knob 19 during a cooking operation of the apparatus 13, the fluid in the power element 40 has expanded in such a manner that a movable wall 39 moves to the right in FIG. 1 a sufficient distance to permit the valve member 34 to close the chamber 32 from the chamber 33. Conversely, when the temperature in the oven falls below the temperature selected by the selector knob 19, the fluid in the power element 40 has contracted to such condition that a compression spring 42 acting on the upper end 43 of the lever 37 causes the same to pivot in a clockwise direction in FIG. 1 a distance sufficient to open the valve member 34 and, thus, interconnect the chamber 32 with the chamber 33 for a purpose hereinafter described.

The pressure regulator construction 14 of this invention is also adapted to interconnect the fuel source conduit 11 to a conduit 44 that is interconnected to the branch passage 30 formed in the housing 18 of the control device 17.

The branch passage 30 of the housing 18 of the control device 17 while leading to the valve portion 29 of the disc valve 28 also leads through a filter chamber 45 to a restrictor 46 that interconnects the main passage 30 with a passage 47 that leads to a pilot selector key 48. The key 48 has a passage 49 therein that is interconnected to a branch passage 50 formed in the housing 18 and leads to a conduit 51 for the pilot burner 27.

The restrictor 46 in the control device 17 is so constructed and arranged that the same is adapted to pass only a sufficient amount of fuel from the passage 30 to the passage 47 and, thus, through the selector key 48 to the pilot burner 27 to produce a small stand-by flame at the pilot burner 27 which is insufficient to cause the detector 26 to cause the main valve means 24 to move to an open condition thereof.

Thus, it can be seen that even through the valve portion 29 of the valve disc 28 is disposed in a closed position disconnecting the passage 30 from the passage 31, the pressure regulator construction 14 is adapted to a manner hereinafter described to supply pressure regulated fuel from the fuel supply conduit 11 in a manner to pass through the restrictor 46 to continuously supply sufficient fuel to the pilot burner 27 to maintain a small standby flame as the pilot burner 27 which will be continuously operating even though the control device 17 is in an "off" condition but such small standby flame at the pilot burner 27 will not effect the detector 26 and, thus, the main valve means 24 will be disposed in a closed position thereof as long as only the small standby flame is burning at the pilot burner 27 in the manner previously described.

The filter chamber 45 of the control device 17 is adapted to be interconnected to pilot burner outlets 52 and 53 that can lead to other pilot burner means of the cooking apparatus 13 as desired, such as pilot burner means for the burner means at the cooling top of the apparatus 13 as is well known in the art.

The chamber 33 of the control device 17 is interconnected by a branch passage 54 in the housing means 18 to the passage 49 of the pilot selector key 48 so that when the valve member 34 is moved to an open condition thereof to interconnect the chamber 32 with the chamber 33, it can be seen that additional fuel from the conduit 44 of the pressure regulator construction 14 is now being fed through the selector key 48 to the pilot burner means 27 when the valve portion 29 is in an open position thereof. This additional amount of fuel being supplied to the pilot burner means 27 when the valve member 34 is moved to an open condition thereof causes the standby flame at the pilot burner means 27 to increase in size and form the aforementioned large heater flame which is now detected by the bulb 26 so that the main valve means 24 moves to an open condition to thereby interconnect the conduit 23 with the conduit 25 as long as the large heater flame exists at the pilot burner means 27. Since the disc valve 28 is in an open position thereof when the selector knob 19 is set to an "on" position thereof, fuel flows from the inlet 26 through the chamber 21 and outlet 22 of the control device 17, the now opened valve means 24 and to the main burner means 15 to issue therefrom and be ignited by the pilot burner means 27 whereby the main burner means 15 will be burning fuel as long as the valve means 24 remains in an open condition.

However, when the bulb 40' detects that the temperature in the oven of the cooking apparatus 13 is now at or slightly above the selected temperature setting of the control knob 19, the power element 40 has moved the lever 37 in such a manner that the valve member 34 moves to its closed position to disconnect the chamber 32 from the chamber 33 so that the additional amount of fuel formerly being supplied to the pilot burner means 27 through the branch passage 54 is terminated and the pilot burner means 27 therefor has its flame reduced to the aforementioned small standby flame whereby the valve means 24 moves to its closed position to disconnect the flow of fuel to the main burner 15.

Conversely, when the temperature in the over 13 falls below the temperature setting of the selector knob 19, the power element 40 causes the lever 37 to move in a clockwise direction to open the valve member 34 so that the additional amount of fuel is now directed to the pilot burner means 27 to cause the large heater flame to exist and be detected by the bulb 26 so that the main valve means 24 moves to an open position. Thus, fuel can now issue from the main burner 15 and tend to heat up the oven of the cooking apparatus 13 to the selected temperature therefor.

Therefore, it can be seen that the control device 17 when set for a cooking operation, opens the valve portions 28 and 29 and causes the burner 15 to cycle on and off to tend to maintain the temperature in the oven at the temperature setting of the selector knob 19 as the valve member 34 will by cycled between its open and closed position to cause a heater flame to exist and not exist at the pilot burner means 27 to control the operation of the valve means 24 and, thus, the operation of the main burner 15 in the manner previously described.

The pressure regulator construction 14 for the control system 10 previously described will now be described and reference is made to FIG. 2 wherein the pressure regulator construction 14 comprises a housing means 55 having an inlet 56 for interconnecting to the fuel source conduit 11 and an outlet 57 for interconnecting to the manifold 12 of the cooking apparatus 13. A valve seat 58 interconnects the inlet 56 with the outlet 57 thereof, the valve seat 58 comprising a resilient valve seat, if desired.

Figure 2:
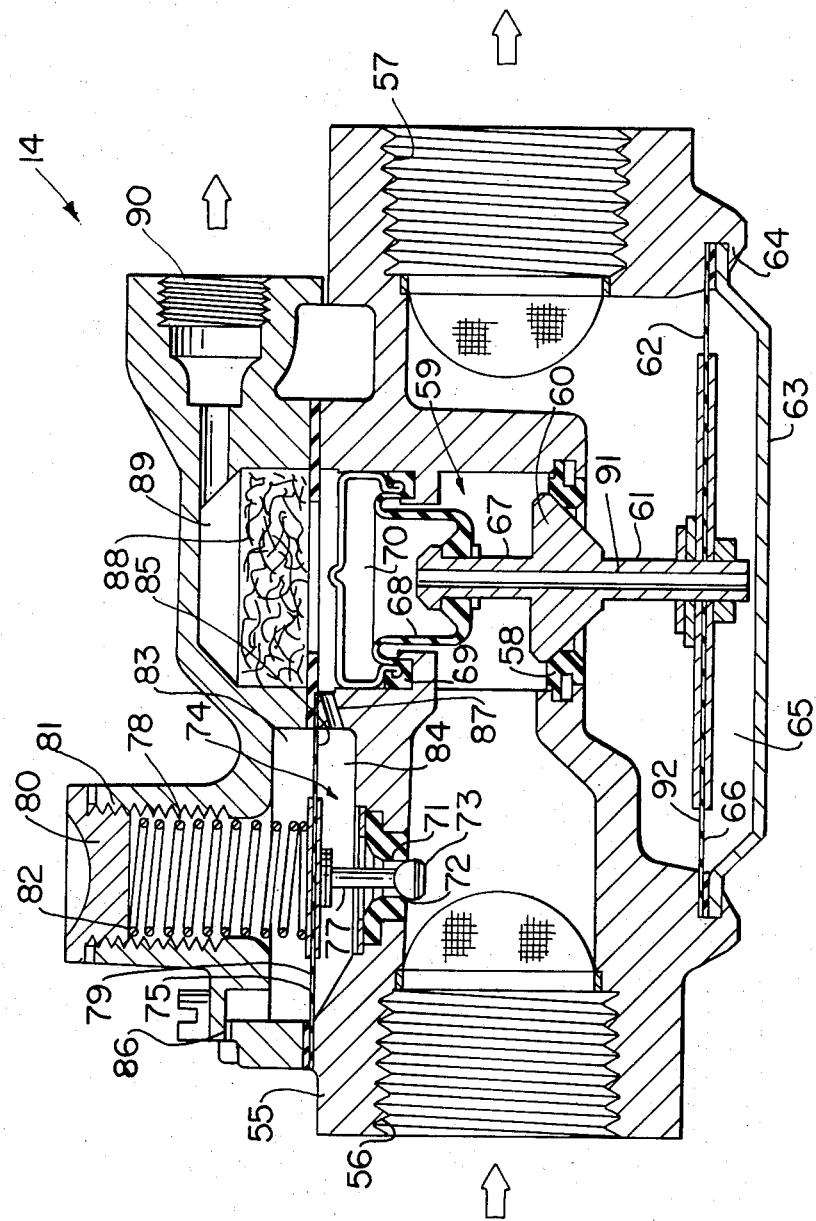
FIG. 2 is an enlarged cross-sectional view taken on line 2—2 of FIG. 1 and illustrates the improved pressure regulator construction of this invention.

A first pressure regulator generally indicated by the reference numeral 58 in FIG. 2 is disposed between the inlet 56 and outlet 57 for controlling the flow of fuel from the inlet 56 to the outlet 57 through the valve seat 58.

In particular, the pressure regulator 59 comprises a relatively large valve member 60 for opening and closing the valve seat 58, the valve member 60 having a stem 61 disposed on the side of the valve member 60 that projects through the valve seat 58 and is interconnected to a flexible disphragm 62 that cooperates with a cup-shaped housing member 63 staked at 64 or otherwise fastened to the housing means 55 to define a fluid biasing chamber 65 disposed on the side 66 of the flexible diaphragm 62. Thus, up and down movement of the diaphragm 62 in a manner hereinafter described causes like up and down movement of the valve member 60 relative to the valve seat 58 for a pressure regulating purpose hereinafter described.

Another stem 67 extends from the other side of the valve member 60 and is interconnected to a flexible diaphragm 68 having its outer periphery 69 secured to the housing 55 and separating the inlet 56 of the housing 55 from an upper chamber 70 formed in the housing 55, the diaphragm 68 having an effective surface area similar to the surface area of the valve member 60 facing the inlet 56 of the housing 55 to balance the valve member 60 so that the pressure in the inlet 56 acting on the supper side of the valve member 60 and the flexible diaphragm 68 will not influence up and down movement of the valve member 60 in a manner well known in the art.

Another inlet 71 is formed in the housing means 55 and is adapted to be interconnected to the inlet 56 as illustrated, the inlet 71 comprising a flexible valve seat 72 adapted to be opened and closed by a valve member 73 of a second pressure regulator 74 carried by the housing means 55.

In particular, the second regulator 74 includes a flexible diaphragm 75 interconnected to a valve stem 77 secured to the valve member 73 and projecting through the valve seat 72 as illustrated in FIG. 2 whereby up and down movement of the flexible diaphragm 75 controls the movement of the valve member 73 relative to the valve seat 72. A compression spring 78 acts against the upper side 79 of the diaphragm 75 to tend to move the valve member 73 away from the valve seat 72 for a purpose hereinafter described, the force of the compression spring 78 acting on the valve member 73 to move the same to an open position being adjustable by an adjustable end cap 80 threadedly disposed in a threaded bore 81 of the housing means 55 as illustrated whereby the adjustable cap 80 bears against the upper end of the compression spring 78.

The diaphragm 75 defines a chamber 83 on the side 79 thereof as well as a chamber 84 on the side 85 thereof, the upper chamber 83 being adapted to be interconnected to the atmosphere by a vent port 86 formed in the housing 55 while the lowe chamber 74 is adapted to be interconnected to the inlet 71. The lower chamber 84 is also interconnected to the chamber 70 by a passage 87 formed in the housing 55, the chamber 70 being interconnected by a filter member 88 to a chamber 89 that leads to an outlet means 90 formed in the housing 55 and being adapted to be interconnected to the pilot burner fuel conduit 44 previously described.

The chamber 70 of the housing 55 is also adapted to be interconnected to the biasing chamber 65 of the first pressure regulator 58 by a passage 91 that passes completely through the valve stems 67 and 61 of the valve member 60 as well as the valve member 60 as illustrated whereby the chamber 70 that is supplied pressure regulated fluid from the second pressure regulator 74 is always interconnected to the biasing chamber 65 of the first pressure regulator 58 whereby the first pressure regulator 59 is operated under the influence of the setting of the second pressure regulator 74 as will be apparent hereinafter.

The operation of the pressure regulator construction 14 of this invention when utilized in the control system 10 will now be described.

When the control device 17 has its control knob 19 disposed in its "off" position so that the disc valve 28 and portion 29 thereof are disposed in closed positions blocking the inlet 16 from the chamber 21 and the passage 30 from the chamber 32, the control device 17 only permits the small standby flame to be continuously burning at the pilot burner 27 in the manner previously described so that the safety valve 24 is disposed in its off position and no fuel can issue from the main burner 15. However, fuel from the fuel source manifold 11 is passing into the inlet 56 of the pressure regulator 14 and through the valve seat 72 of the pressure regulator 74 and into the chamber 84 thereof to act against the under side 85 of the diaphragm 75 to tend to move the same upwardly in opposition to the force of the compression spring 78 and tend to close the valve member 73 against the valve seat 72.

Thus, the pressure regulator 74 maintains the pressure of the fuel passing from the inlets 56 and 71 into the chamber 84 at the proper pressure as set by the adjusting member 80 for the regulator 74 in a manner well known in the art for diaphragm operated pressure regulators whereby the fuel in the chamber 84 passes through the chamber 70 and, thus, the chamber 89, and out through the outlet 90 to the passage 30 of the control device 17. Such regulated fuel passes through the restrictor 46 to the pilot burner 27 to maintain the small standby flame at the pilot burner 27. Such regulated fuel also passes out of the outlets 52 and 53 to other pilot burner means of the cooking apparatus 13. In this manner, the pressure regulator 74 maintains a proper fuel pressure for the pilot burner means of the cooking apparatus 13.

The regulated pressure in the chamber 70 of the pressure regulator construction 14 also passes through the passage 91 of the second pressure regulator 59 into the biasing chamber 65 thereof to act against the lower side 66 of the diaphragm 62 and tend to move the same upwardly to open the valve member 60 away from the valve seat 68. However, the fuel passing through the valve seat 58 acts on the upper side 92 of the diaphragm 66 to tend to oppose the fluid pressure in the chamber 65. Thus, the valve member 60 is positioned relative to the valve seat 58 to provide regulated fuel pressure from the inlet 56 to the outlet 57. However, the outlet 57 is blocked by the disc valve 28 when the selector knob 19 is disposed in its "off" position.

Thus, it can be seen that the pressure regulator 74 is adapted to supply fuel to the pilot burner means of the cooking apparatus 13 independent of th pressure regulator 59 with such pressure regulator 74 having a relatively long opening movement of the valve member 73 away from the valve seat 72 even though only one pilot burner is being operated because the valve member 73 and seat 72 have relatively small effective areas whereby dust and the like cannot collect at the valve seat 72 as would be the case if the valve seat 72 and valve member 73 were relatively large. Further, the pressure regulator 74 is adapted to supply a 100 BTU per hour capacity to the pilot burner means of the cooking apparatus 13 as would be the case if only a single pilot burner was being utilized or is adapted to supply a 1,000 BTU per hour capacity for the pilot burner means for the cooking apparatus 13 should all of the pilot burners of the cooking apparatus 13 be operating at the same time. However, even with the 100 BTU per hour capacity operation of the pressure regulator 74, the valve member 73 is moved away from the valve seat 72 a sufficient distance that dust and the like cannot collect between the valve member 73 and the valve seat 72 to clog the same.

When the control knob 19 of the control device 17 is moved to an "on" position thereof and the valve member 34 is moved away from its valve seat by the lever 37 to cause the large heater flame to exist at the pilot burner 27 in the manner previously described, the safety valve means 24 is moved to an open position so that fuel can now be directed to the main furner means 15.

Since the pressure in the outlet 57 now decreases upon the opening of the valve 24, the pressure regulators 59 has the valve member 60 thereof moved away from the valve seat 58 under the force of the fluid in the biasing chamber 65 so that fuel from the inlet 56 can now enter through the opened valve seat 58 to the outlet 57 and act against the upper side 92 of the diaphragm 62 to oppose the force of the pressure in the biasing chamber 62.

Thus, the pressure regulator 59 maintains the pressure of the fuel entering the outlet 57 at the pressure set by the force of the fluid in the biasing chamber 65 thereof in a manner well known in the art for fluid biasing pressure regulators. However, the fluid pressure setting of the fluid in the biasing chamber 65 of the pressure regulator 59 is set by the adjusting member 80 of the regulator 74 in the manner previously described so that fuel being directed to the main burner means 15 will be at the proper pressure for main burner operation.

Should other main burners be interconnected to the fuel manifold 12 of the cooking apparatus 13 in a conventional manner, the pressure regulator 59 has sufficient capacity to maintain the pressure at the outlet 57 thereof at the set pressure.

For example, the valve member 60 and valve seat 58 are relatively large so that the same are adapted to provide pressure regulation where the capacity requirement is from 1,000 BTU per hour to 150,000 BTU per hour and such main fuel flow is independently of the pressure regulation for the pilot burner means. During such operation of the pressure regulator 59, it can be seen that the pressure regulator 74 for the pilot burner means for the cooking apparatus 13 is being operated independently of the operation of the pressure regulator 59 so that the pilot burner means for the cooking apparatus 13 receives the proper amount and pressure of fuel for operation thereof from the pressure regulator 74 and the main burner means of the cooking apparatus 13 receives the proper amount and pressure of fuel from the pressure regulator 59 for proper operation thereof in the manner previously described.

Thus, the pressure regulator 74 for the pilot burner means of the cooking apparatus 13 will not clog with dust or the like when only the pilot burner means are being operated and the main burner means are in their "off" condition as would be the case if the pressure regulator 59 were utilized to supply both the fuel for the pilot burner means and the main burner means and the main burner means were in the "off" condition so that the valve member 60 would be required to be disposed relativaly close to the valve seat 58 and trap dust and other adverse particles at the valve seat 58.

Therefore, it can be seen that this invention not only provides an improved pressure regulator construction wherein a single adjusting member 80 can be utilized for adjusting two pressure regulators 74 and 59 as the pressure regulator 59 is operated under the influence of the pressure from the regulator 74, but also this invention provides an improved fuel control system utilizing such a pressure regulator construction as well as an improved method of operating such a fuel control system or the like.

While the form and method of this invention now preferred have been described and illustrated as required by the Patent Statutes, other forms and methods can be utilized and still come within the scope of the appended claims.

What is claimed is:

1. In a fuel control system for an apparatus having a source of fuel, main burner means and pilot burner means, the improvement comprising a pressure regulator construction having a housing means provided with an inlet and an outlet, means interconnecting said inlet with said source of fuel, means interconnecting said outlet with said main burner means, a first pressure regulator between said inlet and said outlet for regulating the fluid pressure of the fuel delivered to said outlet, said housing means having an inlet means in fluid communication with said inlet downstream from said first pressure regulator and having an outlet means, means interconnecting said outlet means to said pilot burner means, and a second pressure regulator between said inlet means and said outlet means for regulating the pressure of the fuel delivered to said outlet means, said second pressure regulator controlling the operation of said first pressure regulator, said first pressure regulator having a fluid biasing chamber, said housing means having means for directing fluid pressure from intermediate said second pressure regulator and said outlet means to said chamber, said first pressure regulator having a valve member carried by a flexible diaphragm that defines part of said chamber, said valve member having a passage means therethrough that leads from said means of said housing means to said chamber, said housing means having a balancing diaphragm separating said means thereof from said flexible diaphragm and being interconnected to said valve member in spaced relation to said valve member and said flexible diaphragm to balance said valve member from the influence of fuel pressure at said inlet.

2. In a fuel control system as set forth in claim 1, the further improvement wherein said second pressure regulator is adjustable.

3. In a fuel control system as set forth in claim 1, the further improvement wherein said second pressure regulator has a valve member with a relatively small effective surface area in relation to the surface area of a valve member of said first pressure regulator.

4. In a fuel control system for a cooking apparatus having a source of fuel, main burner means and pilot burner means of the standby and heater flame type, the improvement comprising a first pressure regulator for regulating the fuel pressure from said source to said main burner means, and a second pressure regulator for regulating the fuel pressure from said source to said pilot burner means for both the operation of the standby flame means and the operation of the heater flame means thereof independently of said pressure regulation for said main burner means.

5. In a fuel control system as set forth in claim 11, the further improvement wherein a control device is disposed between said first pressure regulator and said main burner means for controlling the flow of regulated fuel to said main burner means.

6. In a fuel control system as set forth in claim 5, the further improvement wherein said control device has means for controlling the flow of fuel from said second pressure regulator to said pilot burner means only for the heater flame means thereof.

7. In a fuel control system as set forth in claim 6, the further improvement wherein said control device has valve means for completely blocking all fuel flow to said main burner means.

8. In a fuel control system as set forth in claim 7, the further improvement wherein said valve means of said control device is also adapted to completely block all heater flame fuel flow to said pilot burner means.

9. In a method for operating a fuel control system for a cooking apparatus having a source of fuel, main burner means and pilot burner means of the standby and heater flame type, the improvement comprising the steps of regulating the fuel pressure from said source to said main burner means with a first pressure regulator, and regulating the fuel pressure from said source to said pilot burner means with a second pressure regulator for both the operation of the standby flame means and the operation of the heater flame means thereof independently of said pressure regulation for said main burner means.

10. In a method as set forth in claim 9, the further improvement comprising the step of disposing a control device between said first pressure regulator and said main burner means for controlling the flow of regulated fuel to said main burner means.

11. In a method as set forth in claim 10, the further improvement comprising the step of controlling the flow of fuel from said second pressure regulator to said pilot burner means by said control device only for the heater flame means thereof.

12. In a method as set forth in claim 11, the further improvement comprising the step of blocking all fuel flow to said main burner means by a valve means of said control device.

13. In a method as set forth in claim 12, the further improvement comprising the step of blocking all heater flame fuel flow to said pilot burner means with the valve means of said control device.

* * * * *